US012800123B2

(12) United States Patent
Kern et al.

(10) Patent No.: US 12,800,123 B2
(45) Date of Patent: Nov. 17, 2026

(54) LIGHTING DEVICE FOR A MOTOR VEHICLE HEADLAMP

(71) Applicant: ZKW Group GmbH, Wieselburg (AT)

(72) Inventors: Matthias Kern, Prinzersdorf (AT); Andreas Maier, Dunkelsteinerwald (AT); David Reiter, Wieselburg (AT); Rene Poschenreither, Ruprechtshofen (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 19/078,730

(22) Filed: Mar. 13, 2025

(65) Prior Publication Data

US 2025/0297720 A1 Sep. 25, 2025

(30) Foreign Application Priority Data

Mar. 19, 2024 (EP) .................................... 24164612

(51) Int. Cl.
*F21S 41/683* (2018.01)

(52) U.S. Cl.
CPC .................................. *F21S 41/683* (2018.01)

(58) Field of Classification Search
CPC .... F21W 2102/00; B60Q 1/05; B60Q 1/2692; B60Q 1/10058; B60Q 1/0047; F21S 41/692; F21S 41/683
See application file for complete search history.

(56) References Cited

U.S. PATENT DOCUMENTS

| | | | |
|---|---|---|---|
| 2015/0092436 A1 | 4/2015 | King | |
| 2020/0173622 A1 | 6/2020 | Fritzon et al. | |
| 2020/0339033 A1 | 10/2020 | Lim et al. | |
| 2023/0025545 A1* | 1/2023 | Syre ...................... | F21S 41/657 |

FOREIGN PATENT DOCUMENTS

| | | | | |
|---|---|---|---|---|
| CN | 117869822 A | * | 4/2024 | ............. F21V 19/00 |
| CN | 119146382 A | * | 12/2024 | ................ F21V 1/00 |
| FR | 3108703 | | 9/2004 | |
| FR | 3108703 B1 | * | 3/2022 | |

OTHER PUBLICATIONS

ESPACE.net FR 3108703, Abstract and Description translation, English. (Year: 2026).*
Extended European Search Report of EP Patent Application No. 24164612.4 dated Jul. 2, 2024.

* cited by examiner

*Primary Examiner* — Anabel Ton
(74) *Attorney, Agent, or Firm* — Eversheds Sutherland (US) LLP

(57) ABSTRACT

A lighting device for a motor vehicle headlamp, including: a light module, a movable lower aperture element and a movable upper aperture element, a moving device for transferring the aperture elements between a closed position (P1) and an open position (P2) while maintaining spatial alignment of the aperture elements, and a frame on which the moving device is arranged. The lighting device has an alignment device for aligning the aperture elements relative to one another. The alignment device has an alignment element configured to engage in a guide element when the aperture elements are transferred from P2 to P1, so that the alignment element can be guided by the guide element into an end position in the guide element. The alignment element in P1 is connected to the guide element in a manner that the aperture elements are secured against movement along and transverse to the main direction in P1.

18 Claims, 4 Drawing Sheets

LIGHTING DEVICE FOR A MOTOR VEHICLE HEADLAMP

CROSS-REFERENCE TO RELATED APPLICATIONS

This application claims priority to European Patent Application No. 24164612.4, filed Mar. 19, 2024, which is incorporated herein by reference.

TECHNICAL FIELD

The invention relates to a lighting device for a motor vehicle headlamp, the lighting device comprising: (i) at least one light module which is configured to emit light along a light path in the direction of a main direction; (ii) a movable lower aperture element and a movable upper aperture element; and (iii) a moving device for transferring the lower and the upper aperture element in relation to each other between (a) a closed position, in which the lower and the upper aperture element—viewed in the main direction—are positioned in front of the at least one light module and at least partially block the light path of the at least one light module, and (b) an open position in which the lower and upper aperture elements are moved away from the light path of the at least one light module in order to clear the light path of the at least one light module, while maintaining the spatial alignment of the upper and lower aperture element; and (iv) a frame which is stationary with respect to the movement of the lower and upper aperture elements, wherein the moving device is arranged on the frame.

The invention also relates to a motor vehicle headlamp comprising at least one lighting device according to the invention.

TECHNICAL BACKGROUND

In the state of the art, there are lighting devices with an upper and lower aperture element that can be switched between an open and a closed position. However, this requires complicated mechanics, whereby, among other things, it must be ensured that the aperture elements are actually closed in the closed position. During driving, however, vibrations and temperature differences in the vehicle headlamp can cause the position of the lower and upper aperture elements to vary and shift relative to each other in the closed position. Furthermore, the upper and lower aperture elements can comprise design elements that are matched to each other so that the position of the aperture elements in relation to each other must be ensured in the closed position. For example, such design elements can be vertical lines that start on the upper aperture element and continue in the lower aperture element. Shifting or distorting the aperture elements in relation to each other would result in the intended vertical line no longer being recognizable as such.

SUMMARY OF THE INVENTION

It is therefore an object of the invention to provide an improved lighting device.

This object is solved in that the lighting device comprises at least one alignment device for aligning the lower and upper aperture elements with respect to one another in the closed position, wherein the at least one alignment device comprises an alignment element, and a guide element complementary to the alignment element, wherein the alignment element is configured to engage in the guide element when the lower and upper aperture elements are transferred from the open position to the closed position, so that the alignment element can be guided by the guide element into an end position in the guide element, wherein the alignment element in the closed position of the lower and upper aperture element is connected in a form-fitting manner to the guide element in the end position in the guide element, so that the upper and lower aperture elements are secured against movement along and transverse to the main direction in the closed position.

"Transverse to the main direction" also includes upwards and downwards to the main direction. In general, indications such as "up", "down", "left", "right", "sideways", etc. refer to a lighting device in a motor vehicle headlamp in a correctly installed state of the motor vehicle headlamp in a motor vehicle.

It may be provided that the upper and lower aperture elements are designed as light-emitting elements which are configured to emit light in the closed position, preferably in the direction of the main direction, and wherein preferably the aperture elements designed as light-emitting elements do not emit any light in the open position.

It may be provided that the alignment element is substantially conical, wherein the guide element is designed to complement the alignment element such that the conically-shaped alignment element is mounted in a form-fitting manner in the guide element in the end position.

It may be provided that the lighting device comprises at least two alignment devices.

It may be provided that the alignment element is arranged on the upper aperture element and the guide element is arranged on the lower aperture element, or the alignment element is arranged on the lower aperture element and the guide element is arranged on the upper aperture element.

It may be provided that the alignment element is formed elastically, wherein preferably the alignment element is formed from a plastic, preferably PP-GF30 (polypropylene with 30% glass fiber), which is overmolded with an elastic material, preferably TPE (thermoplastic elastomers).

It may be provided that the lighting device comprises a damping device configured to damp the lower and the upper aperture elements when transferring them into the open position, wherein the damping device comprises at least two pairs of an elastic damping element and a stop corresponding to the damping element, wherein at least one pair is assigned to each of the lower and upper aperture elements, and wherein, when the aperture elements are moved into the open position, the damping elements strike against the corresponding stops in such a way that compression of the damping elements damps the movement of the lower and upper aperture elements into the open position.

It may be provided that the damping elements of the pairs are arranged on the lower and upper aperture element and the stops are arranged on the frame, or the damping elements are arranged on the frame and the stops are arranged on the upper and lower aperture element.

It is possible that the damping elements are made of EPDM (ethylene-propylene-diene; M-group (synthetic rubber)).

It is possible that the damping elements are shaped in the form of a hemisphere.

The problem is also solved by a motor vehicle headlamp comprising at least one lighting device.

BRIEF DESCRIPTION OF THE DRAWINGS

The invention is explained in more detail below with reference to exemplary drawings.

DETAILED DESCRIPTION OF EMBODIMENTS

Figure 1:
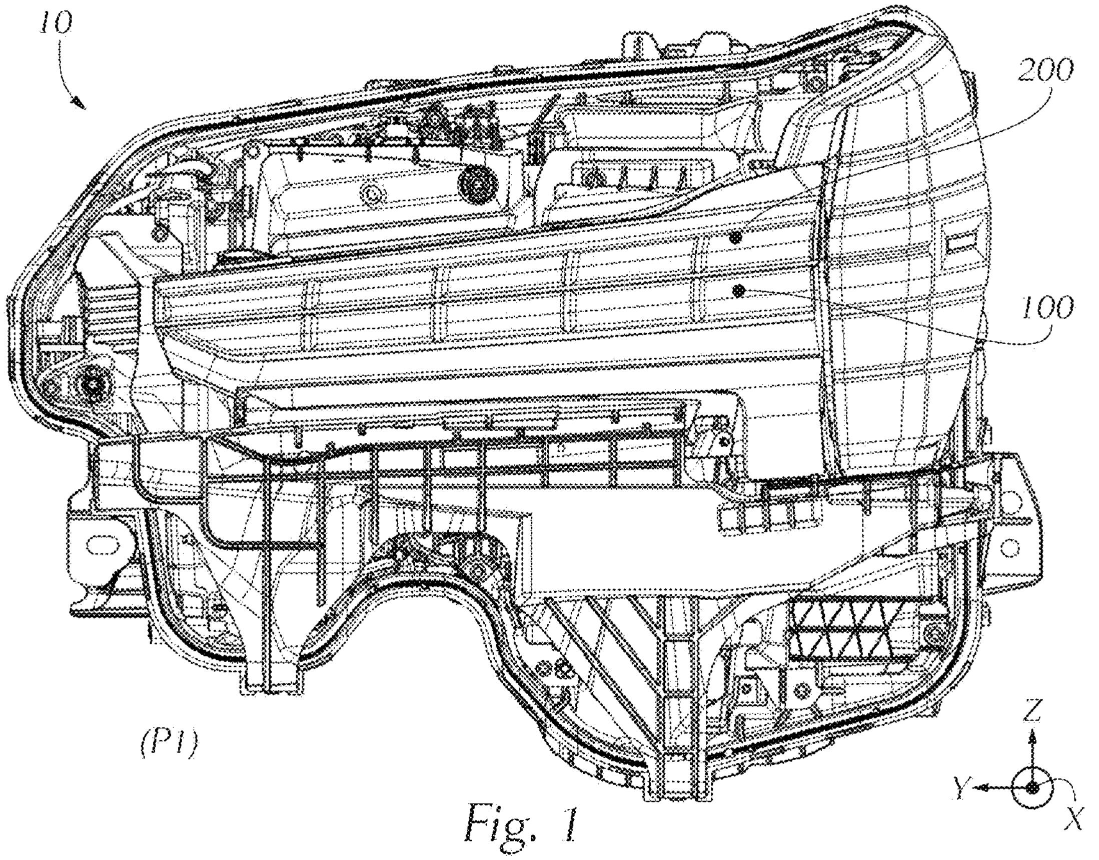
FIG. 1 is a front view of an exemplary motor vehicle headlamp with an exemplary lighting device comprising an upper and lower aperture element in a closed position.
Figure 2:
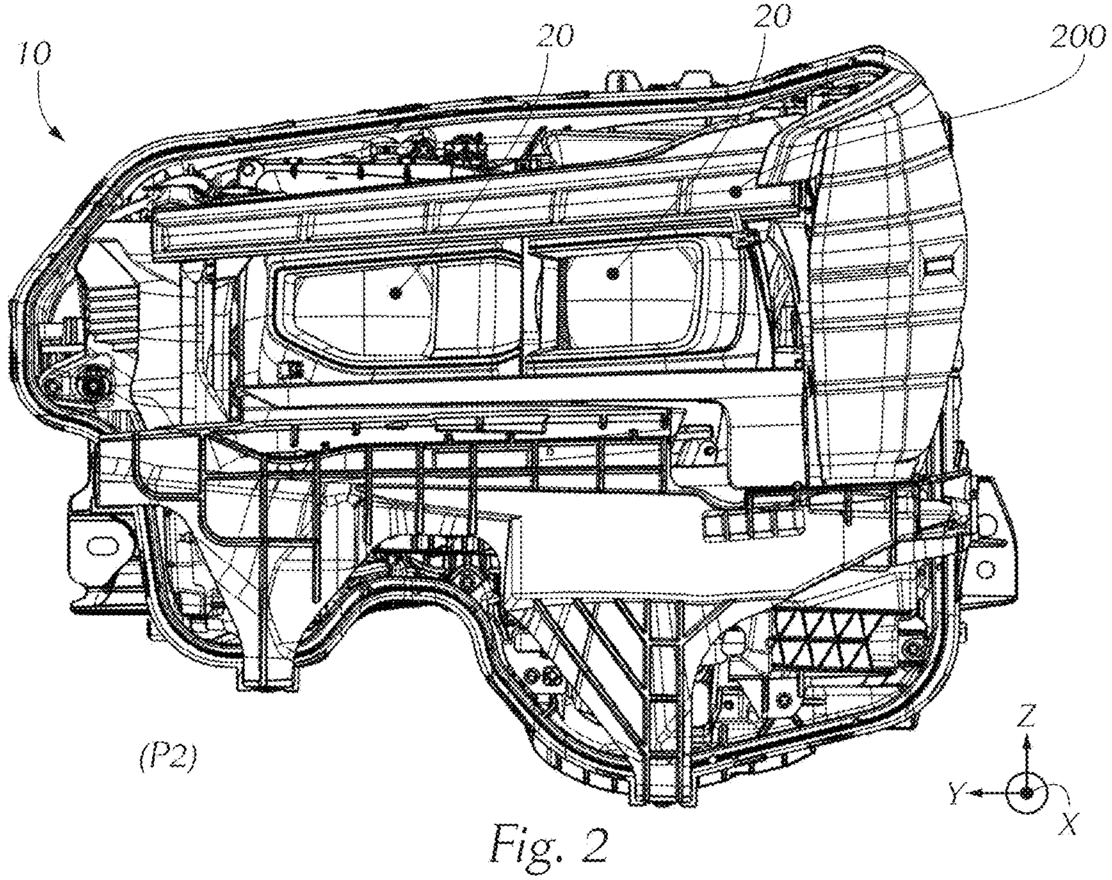
FIG. 2 is a front view of the motor vehicle headlamp from FIG. 1 with the upper and lower aperture element in an open position, whereby two light modules are released for emitting light in the open position.

FIG. 1 shows a lighting device 10 for a motor vehicle headlamp, wherein the lighting device 10 in the example shown comprises two light modules 20, which are each configured to emit light along a light path in the direction of a main direction X, wherein the light modules 20 can be seen in FIG. 2.

Furthermore, the lighting device 10 comprises a movable lower aperture element 100 and a movable upper aperture element 200, wherein in addition the lighting device 10 comprises a moving device for transferring the lower and upper aperture elements 100, 200 in relation to each other between

- a closed position P1, in which the lower and upper aperture elements 100, 200—viewed in the main direction X—are positioned in front of the two light modules 20 and at least partially block the light path of the two light modules 20, and
- an open position P2, in which the lower and upper aperture elements 100, 200 are moved away from the light path of the two light modules in order to clear the light path of the two light modules 20, while maintaining the spatial alignment of the upper and lower aperture elements 100, 200.

The upper and lower aperture elements 100, 200 are designed as light-emitting elements, which are configured to emit light in the closed position P1, preferably in the direction of the main direction X, and preferably the aperture elements 100, 200 designed as light-emitting elements do not emit any light in the open position P2.

Furthermore, the lighting device 10 comprises a frame 300 which is stationary with respect to the movement of the lower and upper aperture elements 100, 200, wherein the movement device is arranged on the frame 300.

The lighting device 10 further comprises alignment devices 400 for aligning the lower and upper aperture elements 100, 200 to one another in the closed position P1, wherein one alignment device 400 in each case comprises an alignment element 400*a* and a guide element 400*b* complementary to the alignment element 400*a*. In the example shown, the alignment element 400*a* is arranged on the upper aperture element 200 and the guide element 400*b* is arranged on the lower aperture element 100. The alignment element 400*a* is in each case elastically formed, wherein the alignment elements 400*a* are formed from a plastic, preferably PP-GF30 (polypropylene with 30% glass fiber), which is overmolded with an elastic material, preferably TPE (thermoplastic elastomers).

Figure 5:
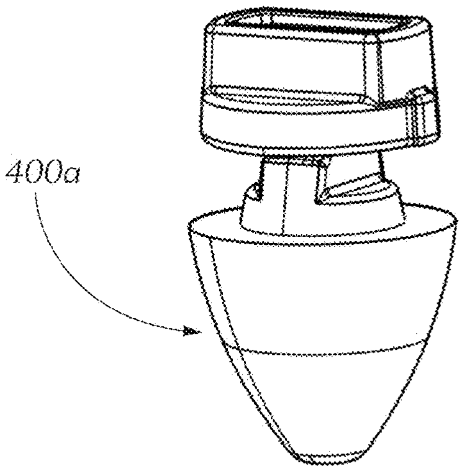
FIG. 5 is a perspective single view of an exemplary alignment element in conical form.
Figure 7:
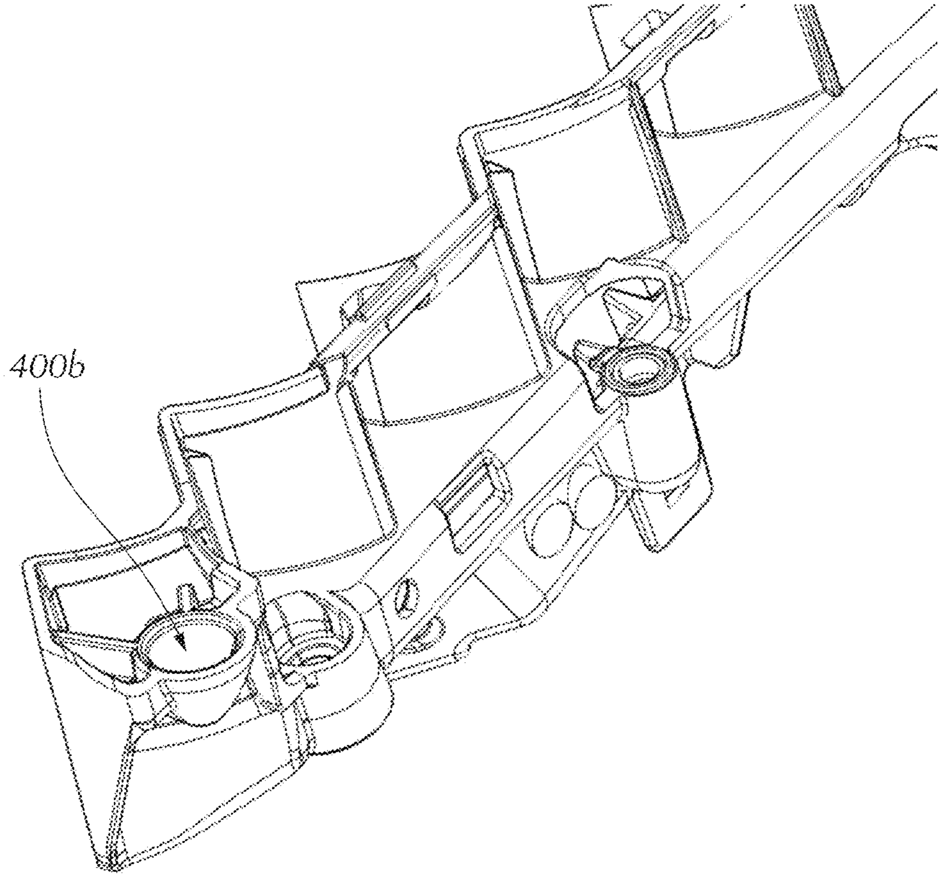
FIG. 7 is a perspective view of a part of the lower aperture element with a guide element of the alignment device.

An alignment element 400*a* of an alignment device 400 can be seen in FIG. 5, while a guide element 400*b* of an alignment device 400 can be seen in FIG. 7.

Figure 4:
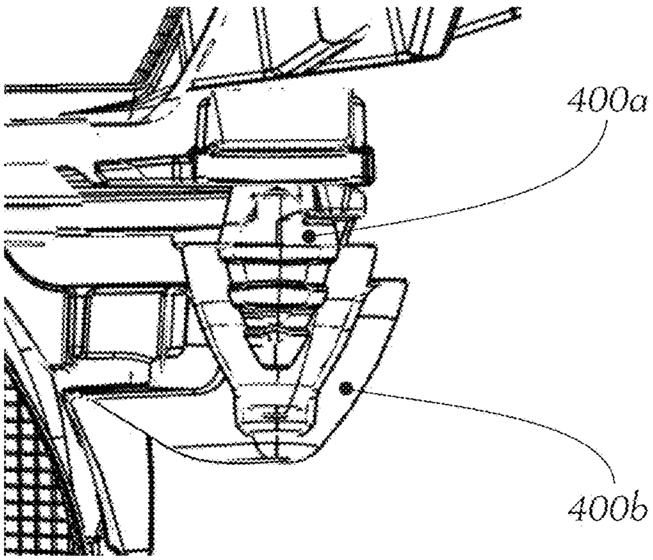
FIG. 4 is a detailed view of the alignment device from FIG. 3 in the closed position of the lower and upper aperture element.

As can be seen in FIG. 5, the alignment element 400*a* is substantially conical in shape, with the guide element 400*b* being complementary to the alignment element 400*a* in such a way that the conically-shaped alignment element 400*a* is mounted in a form-fitting manner in the guide element 400*b* in the end position, which is shown in FIG. 4.

The alignment element 400*a* is configured to engage in the guide element 400*b* when the lower and upper aperture elements 100, 200 are transferred from the open position P2 to the closed position P1, so that the alignment element 400*a* can be guided by the guide element 400*b* into an end position in the guide element 400*b*.

Figure 3:
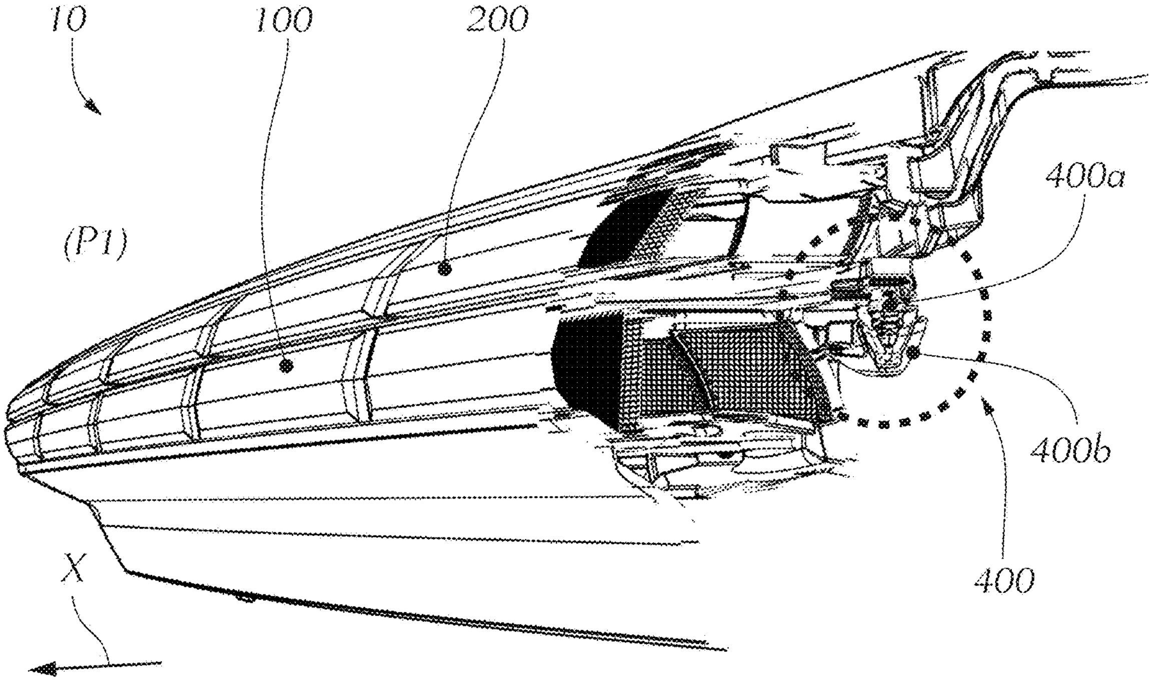
FIG. 3 is a perspective cross-sectional view of the upper and lower aperture element in the closed position, wherein the lighting device comprises an alignment device with an alignment element and a guide element corresponding thereto, wherein the alignment element engages in the guide element in the closed position shown.

In the closed position P1 of the lower and upper aperture elements 100, 200 the alignment element 400*a* is connected in a form-fitting manner to the guide element 400*b* in the end position in the guide element 400*b*, so that the upper and lower aperture element 100, 200 are secured against movement along and transverse to the main direction X in the closed position P1. This can be clearly seen in FIG. 3, for example.

Figure 6:
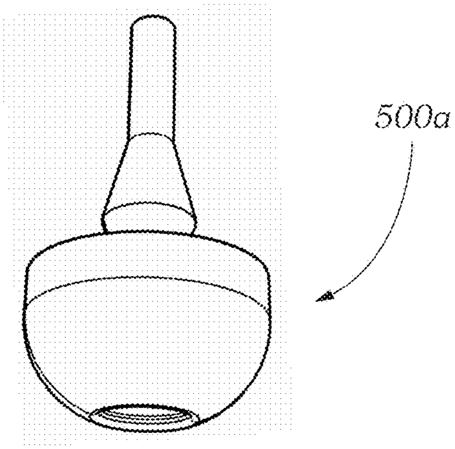
FIG. 6 is a single perspective view of an exemplary damping element.
Figure 8:
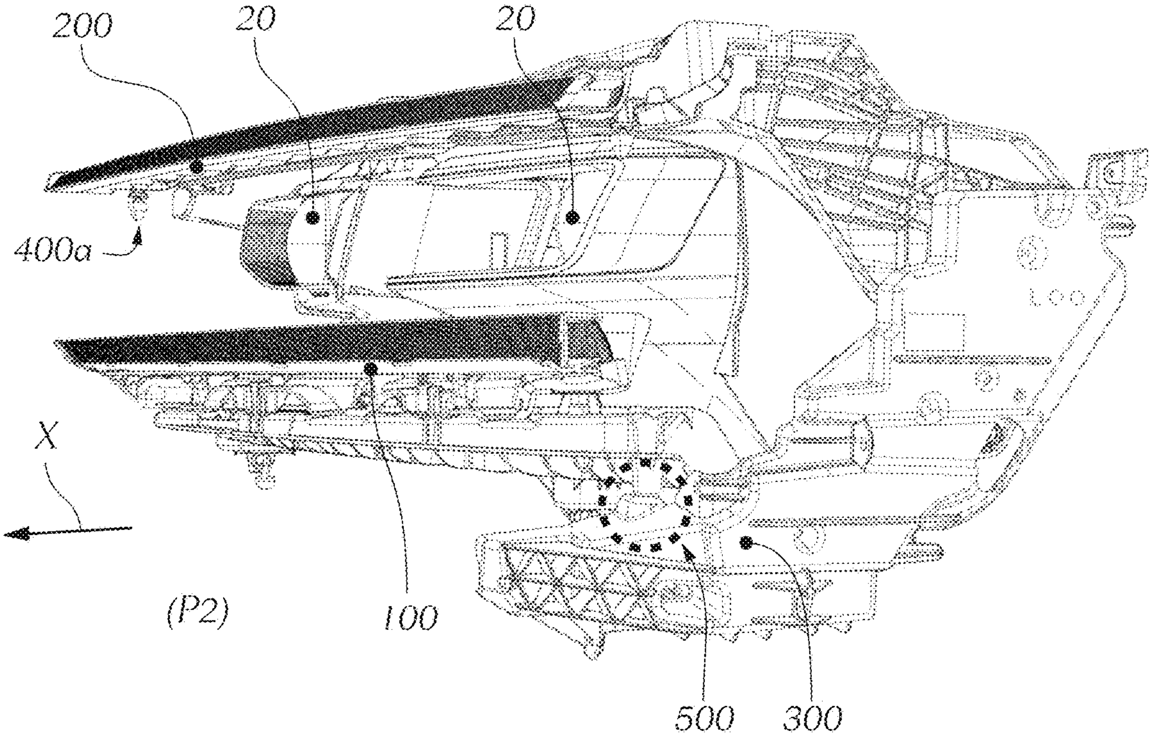
FIG. 8 is a perspective side view of the lighting device, the lower and upper aperture elements being in an open position, an exemplary damping device being shown in a dotted circle, which comprises at least one pair comprising a damping element (as shown in FIG. 6) and a stop corresponding thereto.

Furthermore, the lighting device 10 comprises a damping device 500, which is configured to damp the lower and the upper aperture element 100, 200 when transferring them into the open position P2, as shown by way of example in FIG. 8. The damping device 500 comprises several pairs of an elastic damping element 500*a*, which is shown in FIG. 6, and a stop 500*b* corresponding to the damping element 500*a*. As can be seen in FIG. 6, the damping elements 500*a* are shaped in the form of a hemisphere.

Figure 9:
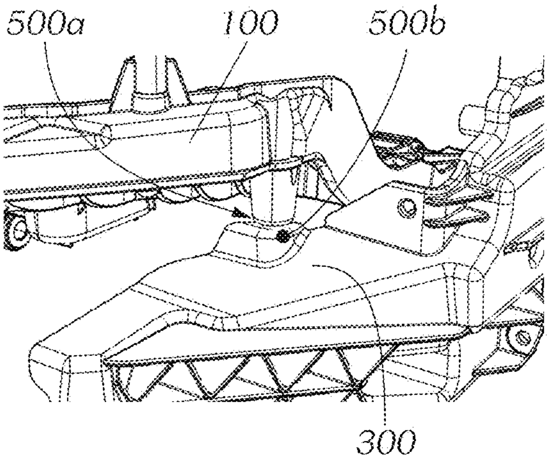
FIG. 9 is a detailed view of a pair of the damping device in the open position of the lower and upper aperture element, the damping element being compressed at the stop.
Figure 10:
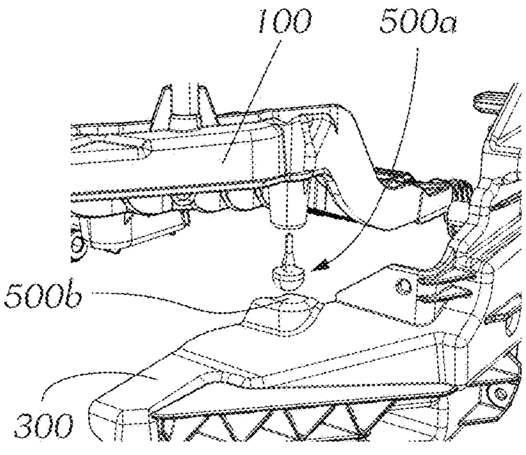
FIG. 10 is an exploded view of the pair of damping devices shown in FIG. 9.

At least one pair is assigned to each of the lower and upper aperture elements 100, 200, whereby when the aperture elements 100, 200 are moved into the open position P2, the damping elements 500*a* strike against the corresponding stops 500*b* in such a way that compression of the damping elements 500*a* damps the movement of the lower and upper aperture elements 100, 200 into the open position. FIG. 10 shows a pair of the damping device 500 in an exploded view, whereas FIG. 9 shows the pair in the open position of the aperture elements 100, 200.

The damping elements 500*a* of the pairs are arranged on the lower and upper aperture elements 100, 200 and the stops are arranged on the frame 300. In the example shown, the damping elements 500*a* are made of EPDM (ethylene-propylene-diene; M group (synthetic rubber)).

LIST OF REFERENCE SIGNS

Lighting device . . . 10
Light module . . . 20
Lower aperture element . . . 100
Upper aperture element . . . 200
Frame . . . 300
Alignment device . . . 400
Alignment element . . . 400*a*
Guide element . . . 400*b*
Damping device . . . 500
Damping element . . . 500*a*
Stop . . . 500*b*
Closed position . . . P1
Open position . . . P2
Main direction . . . X That which is claimed is:

1. A lighting device (10) for a motor vehicle headlamp, the lighting device (10) comprising:

at least one light module (20) which is configured to emit light along a light path in the direction of a main direction (X);

a movable lower aperture element (100) and a movable upper aperture element (200);

a moving device for transferring the lower and the upper aperture elements (100, 200) in relation to each other between:

a closed position (P1), in which the lower and the upper aperture element (100, 200)—viewed in the main direction (X)—are positioned in front of the at least one light module (20) and at least partially block the light path of the at least one light module (20), and an open position (P2) in which the lower and upper aperture elements (100, 200) are moved away from the light path of the at least one light module (20) in order to clear the light path of the at least one light module (20), while maintaining the spatial alignment of the upper and lower aperture element (100, 200); and a frame (300) which is stationary with respect to the movement of the lower and upper aperture elements (100, 200), wherein the moving device is arranged on the frame (300), wherein the lighting device (10) comprises at least one alignment device (400) for aligning the lower and upper aperture elements (100, 200) with respect to one another in the closed position (P1), wherein the at least one alignment device (400) comprises:

an alignment element (400*a*), and a guide element (400*b*) complementary to the alignment element (400*a*), wherein the alignment element (400*a*) is configured to engage in the guide element (400*b*) when the lower and upper aperture elements (100, 200) are transferred from the open position (P2) to the closed position (P1), so that the alignment element (400*a*) can be guided by the guide element (400*b*) into an end position in the guide element (400*b*), wherein the alignment element (400*a*) in the closed position (P1) of the lower and upper aperture element (100, 200) is connected in a form-fitting manner to the guide element (400*b*) in the end position in the guide element (400*b*), so that the upper and lower aperture elements (100, 200) are secured against movement along and transverse to the main direction (X) in the closed position (P1), wherein the alignment element (400*a*) is arranged on the upper aperture element (200) and the guide element (400*b*) is arranged on the lower aperture element (100), or the alignment element (400*a*) is arranged on the lower aperture element (100) and the guide element (400*b*) is arranged on the upper aperture element (200).

2. The lighting device (10) according to claim 1, wherein the upper and lower aperture elements (100, 200) are designed as light-emitting elements which are configured to emit light in the closed position (P1).

3. The lighting device (10) according to claim 1, wherein the alignment element (400*a*) is substantially conical, wherein the guide element (400*b*) is designed to complement the alignment element (400*a*) such that the conically-shaped alignment element (400*a*) is mounted in a form-fitting manner in the guide element (400*b*) in the end position.

4. The lighting device (10) according to claim 1, wherein the lighting device (10) comprises at least two alignment devices (400).

5. The lighting device (10) according to claim 1, wherein the alignment element (400*a*) is formed elastically.

6. The lighting device (10) according to claim 1, wherein the lighting device (10) comprises a damping device (500) configured to damp the lower and the upper aperture elements (100, 200) when transferring them into the open position (P2), wherein the damping device (500) comprises at least two pairs of an elastic damping element (500*a*) and a stop (500*b*) corresponding to the damping element (500*a*), wherein at least one pair is assigned to each of the lower and upper aperture elements (100, 200), and wherein, when the aperture elements (100, 200) are moved into the open position (P2), the damping elements (500*a*) strike against the corresponding stops (500*b*) in such a way that compression of the damping elements (500*a*) damps the movement of the lower and upper aperture elements (100, 200) into the open position.

7. The lighting device (10) according to claim 6, wherein the damping elements (500*a*) of the pairs are arranged on the lower and upper aperture element (100, 200) and the stops are arranged on the frame (300), or the damping elements (500*a*) are arranged on the frame (300) and the stops (500*b*) are arranged on the upper and lower aperture element (100, 200).

8. The lighting device (10) according to claim 6, wherein the damping elements (500*a*) are made of EPDM.

9. The lighting device (10) according to claim 6, wherein the damping elements (500*a*) are shaped in the form of a hemisphere.

10. A motor vehicle headlamp comprising at least one lighting device (10) according to claim 1.

11. The lighting device (10) according to claim 2, wherein the light-emitting elements are configured to emit the light in the closed position (P1) in the direction of the main direction (X).

12. The lighting device (10) according to claim 11, wherein the aperture elements (100, 200) designed as light-emitting elements do not emit any light in the open position (P2).

13. The lighting device (10) according to claim 5, wherein the alignment element (400*a*) is formed from a plastic, which is overmolded with an elastic material.

14. The lighting device (10) according to claim 13, wherein the plastic comprises polypropylene with 30% glass fiber and the elastic material comprises a thermoplastic elastomer.

15. A lighting device (10) for a motor vehicle headlamp, the lighting device (10) comprising:

at least one light module (20) which is configured to emit light along a light path in the direction of a main direction (X);

a movable lower aperture element (100) and a movable upper aperture element (200);

a moving device for transferring the lower and the upper aperture elements (100, 200) in relation to each other between:

a closed position (P1), in which the lower and the upper aperture element (100, 200)—viewed in the main direction (X)—are positioned in front of the at least one light module (20) and at least partially block the light path of the at least one light module (20), and an open position (P2) in which the lower and upper aperture elements (100, 200) are moved away from the light path of the at least one light module (20) in order to clear the light path of the at least one light module (20), while maintaining the spatial alignment of the upper and lower aperture element (100, 200); and a frame (300) which is stationary with respect to the movement of the lower and upper aperture elements (100, 200), wherein the moving device is arranged on the frame (300), wherein the lighting device (10) comprises at least one alignment device (400) for aligning the lower and upper aperture elements (100, 200) with respect to one another in the closed position (P1), wherein the at least one alignment device (400) comprises:

an alignment element (400*a*), and a guide element (400*b*) complementary to the alignment element (400*a*), wherein the alignment element (400*a*) is configured to engage in the guide element (400*b*) when the lower and upper aperture elements (100, 200) are transferred from the open position (P2) to the closed position (P1), so that the alignment element (400*a*) can be guided by the guide element (400*b*) into an end position in the guide element (400*b*), wherein the alignment element (400*a*) in the closed position (P1) of the lower and upper aperture element (100, 200) is connected in a form-fitting manner to the guide element (400*b*) in the end position in the guide element (400*b*), so that the upper and lower aperture elements (100, 200) are secured against movement along and transverse to the main direction (X) in the closed position (P1), and wherein the lighting device (10) comprises a damping device (500) configured to damp the lower and the upper aperture elements (100, 200) when transferring them into the open position (P2), wherein the damping device (500) comprises at least two pairs of an elastic damping element (500*a*) and a stop (500*b*) corresponding to the damping element (500*a*), wherein at least one pair is assigned to each of the lower and upper aperture elements (100, 200), and wherein, when the aperture elements (100, 200) are moved into the open position (P2), the damping elements (500*a*) strike against the corresponding stops (500*b*) in such a way that compression of the damping elements (500*a*) damps the movement of the lower and upper aperture elements (100, 200) into the open position.

16. The lighting device (10) according to claim 15, wherein the damping elements (500*a*) of the pairs are:

arranged on the lower and upper aperture element (100, 200) and the stops are arranged on the frame (300), or the damping elements (500*a*) are arranged on the frame (300) and the stops (500*b*) are arranged on the upper and lower aperture element (100, 200), made of EPDM, and shaped in the form of a hemisphere.

17. A lighting device (10) for a motor vehicle headlamp, the lighting device (10) comprising:

at least one light module (20) which is configured to emit light along a light path in the direction of a main direction (X);

a movable lower aperture element (100) and a movable upper aperture element (200);

a moving device for transferring the lower and the upper aperture elements (100, 200) in relation to each other between:

a closed position (P1), in which the lower and the upper aperture element (100, 200)—viewed in the main direction (X)—are positioned in front of the at least one light module (20) and at least partially block the light path of the at least one light module (20), and an open position (P2) in which the lower and upper aperture elements (100, 200) are moved away from the light path of the at least one light module (20) in order to clear the light path of the at least one light module (20), while maintaining the spatial alignment of the upper and lower aperture element (100, 200); and a frame (300) which is stationary with respect to the movement of the lower and upper aperture elements (100, 200), wherein the moving device is arranged on the frame (300), wherein the lighting device (10) comprises at least one alignment device (400) for aligning the lower and upper aperture elements (100, 200) with respect to one another in the closed position (P1), wherein the at least one alignment device (400) comprises:

an alignment element (400*a*), and a guide element (400*b*) complementary to the alignment element (400*a*), wherein the alignment element (400*a*) is configured to engage in the guide element (400*b*) when the lower and upper aperture elements (100, 200) are transferred from the open position (P2) to the closed position (P1), so that the alignment element (400*a*) can be guided by the guide element (400*b*) into an end position in the guide element (400*b*), wherein the alignment element (400*a*) in the closed position (P1) of the lower and upper aperture element (100, 200) is connected in a form-fitting manner to the guide element (400*b*) in the end position in the guide element (400*b*), so that the upper and lower aperture elements (100, 200) are secured against movement along and transverse to the main direction (X) in the closed position (P1), wherein the alignment element (400*a*) is formed elastically from a plastic, which is overmolded with an elastic material.

18. The lighting device (10) according to claim 17, wherein the plastic comprises polypropylene with 30% glass fiber and the elastic material comprises a thermoplastic elastomer.

* * * * *